J. COOKERLEY.
NUT LOCKING WASHER.
APPLICATION FILED JULY 6, 1911.
1,038,528.
Patented Sept. 17, 1912.
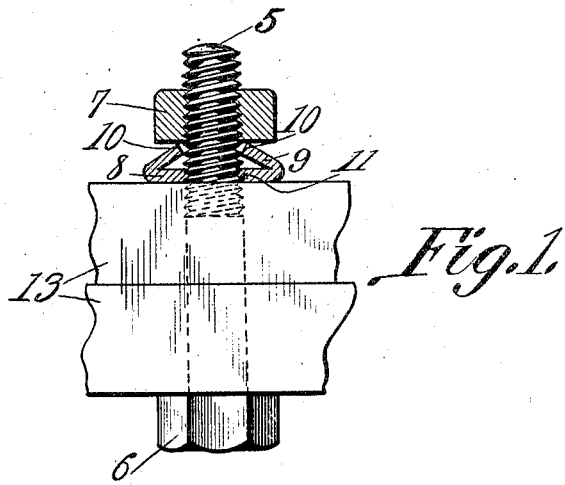
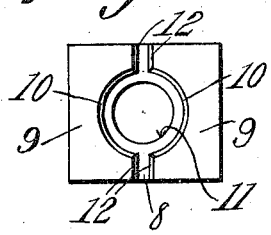
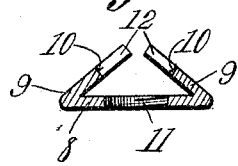
Witnesses
Josiah Cookerley
Inventor
by
Attorneys

UNITED STATES PATENT OFFICE.

JOSIAH COOKERLEY, OF SOUTH MILFORD, INDIANA.

NUT-LOCKING WASHER.

1,038,528.      Specification of Letters Patent.      Patented Sept. 17, 1912.

Application filed July 6, 1911. Serial No. 637,137.

*To all whom it may concern:*

Be it known that I, JOSIAH COOKERLEY, a citizen of the United States, residing at South Milford, in the county of Lagrange and State of Indiana, have invented a new and useful Nut-Locking Washer, of which the following is a specification.

This invention relates to nut-locking washers, and has for its object to provide an improved means for locking nuts on bolts which shall be efficient, simple and cheap to manufacture.

In a device of this character the said characteristics are necessary to provide for the commercial success thereof, and it is in view of the simplicity of this device that it presents a novel nut-lock washer.

This device comprises a rectangular plate of spring steel or sheet metal of suitable thickness having a screw-threaded opening centrally thereof and the ends bent upward and inward forming lips which converge toward each other and being spaced slightly apart at their adjoining ends, said lips being provided with concaved notches at their adjacent edges which form an opening through the lips concentric with the screw-threaded opening, for the passage of a bolt therethrough. These notches form teeth which are adapted to bite the nut to carry the washer along with the same.

This invention is illustrated in the accompanying drawing, in which similar reference characters indicate similar parts, and in which,—

Figure 1 is an elevation of the washer as applied to a bolt and nut, the nut and washer being shown in section. Fig. 2 is a plan view of the washer. Fig. 3 is a sectional view of the washer.

Referring specifically to the drawings, 8 indicates the main portion or body of the washer comprising the intermediate portion of the rectangular plate of spring steel, it being preferably square in contour. The body 8 has a central screw-threaded opening 11 therein. The lips or ends of the plates are indicated at 9, which converge upward and are spaced slightly apart at their upper ends. These lips 9 have at their adjacent ends concaved notches 10 which form an opening through the lips concentric with the screw-threaded opening 11. The notches 10 also form oppositely disposed teeth or prongs 12 at each side of the lips.

A bolt 5 bearing a head 6 is shown as inserted through a hole in the objects 13, and 7 indicates a nut on the screw-threaded end of the bolt under which nut is arranged the washer.

The washer and nut are applied as follows: The washer is screwed on the screw-threaded end of the bolt 5 to bring the body thereof against the object 13 and the nut is screwed on the bolt over the washer. As the nut is tightened the lips 9 are bent toward the body 8 and the tooth or prong 12 on each side, projecting opposite to the direction of rotation of the nut, catches in the under side of the nut and carries the washer with the nut to tighten both the washer and nut on the object. The washer being square can be engaged by a wrench together with the nut to turn them both simultaneously. Upon reversing the rotation of the nut the opposite teeth 12 engage the inner face of the nut to rotate the washer and thus to release the washer. Upon clamping the nut very tightly over the washer the concaved edges of the lip 9 may be made to bite the threads on the bolt to hold the various parts in locked position. A device constructed in accordance with this description is very cheap to manufacture, and is convenient in application and efficient in its use.

It is to be noted that the notches 10 define an opening which is larger than the opening 11 in the body portion 8 of the washer. Owing to this construction, the nut 7 may be rotated, to aline the edges of the nut 7 with the edges of the body 8, so that the nut and the washer may be engaged for simultaneous rotation by a wrench, without causing the ends of the lips 9 to bite into the threads of the bolt 5. The nut and the bolt may then be rotated together until the body portion of the washer is in abutment with the object 13.

Having described my invention what I claim as new is:—

A device of the class described comprising a bolt; a nut thereon; and a locking washer interposed between the nut and the object through which the bolt passes; the washer comprising a body portion of the same contour as the nut whereby the nut and the washer may be engaged simultaneously by a wrench and upturned, converging lips engaging terminally with the nut, and compressible by the nut to engage with the threads of the bolt; there being an opening in the body, threaded to engage with the bolt, and concaved notches in the ends of lips, the notches defining an opening which is larger than the opening in the body, whereby the nut may be rotated, independently of the washer, to aline the peripheries of the nut and of the washer, for engagement by the wrench, whereby the washer and the nut may be rotated together until the washer engages the material.

In testimony that I claim the foregoing as my own, I have hereto affixed my signature in the presence of two witnesses.

JOSIAH COOKERLEY.

Witnesses:
A. B. COOKERLY,
W. T. MORGAN.

Copies of this patent may be obtained for five cents each, by addressing the "Commissioner of Patents, Washington, D. C."